(12) United States Patent
Menaldo Moretta et al.

(10) Patent No.: US 6,297,893 B1
(45) Date of Patent: Oct. 2, 2001

(54) FACSIMILE MACHINE PROVIDED WITH A TELEPHONIC HANDSET

(75) Inventors: Gabriele Menaldo Moretta, Burolo; Renzo Gozzano, Salerano Canavese, both of (IT)

(73) Assignee: Olivetti Tecnost S.p.A., Ivrea (IT)

( * ) Notice: Subject to any disclaimer, the term of this patent is extended or adjusted under 35 U.S.C. 154(b) by 0 days.

(21) Appl. No.: 09/145,649

(22) Filed: Sep. 2, 1998

(30) Foreign Application Priority Data

Sep. 3, 1997 (IT) .............................................. TO97A0780

(51) Int. Cl.[7] ...................................................... H04N 1/04
(52) U.S. Cl. ............................................. 358/498; 358/400
(58) Field of Search .................................. 358/498, 474, 358/476, 400, 405, 296, 426, 500

(56) References Cited

U.S. PATENT DOCUMENTS

| | | | | |
|---|---|---|---|---|
| 5,265,152 | * | 11/1993 | Kotani | 379/100 |
| 5,276,509 | * | 1/1994 | Mizuno | 358/500 |
| 5,737,097 | * | 4/1998 | Fujimoto | 358/476 |
| 6,040,919 | * | 3/2000 | Iwata | 358/498 |

* cited by examiner

*Primary Examiner*—Jerome Grant, II
*Assistant Examiner*—Negussie Worku
(74) *Attorney, Agent, or Firm*—Banner & Witcoff, Ltd.

(57) ABSTRACT

A facsimile machine (10), connected to a telephone line (L), includes a telephone handset (17) and a flip-up lid (12) having a cradle (19) for removably accommodating the telephone handset (17). The lid (12) is provided with catches (22a,22b) that cooperate with the telephone handset, (17) releasing it so that it can be picked up when the lid (12) is closed on the casing of the facsimile machine (10), and retaining it on the lid (12) to prevent it from falling out of its cradle (19), when the lid (12) is flipped up. The availability and use of the telephone line (L) for making voice telephone calls through the handset (17) are controlled in relation to presence of the latter (17) in its cradle (19) and to the position of the lid (12). In particular, the telephone line (L) will remain free even when the lid (12) is flipped up with the telephone handset (17) in its cradle, thus permitting the reception of incoming voice telephone calls.

7 Claims, 3 Drawing Sheets

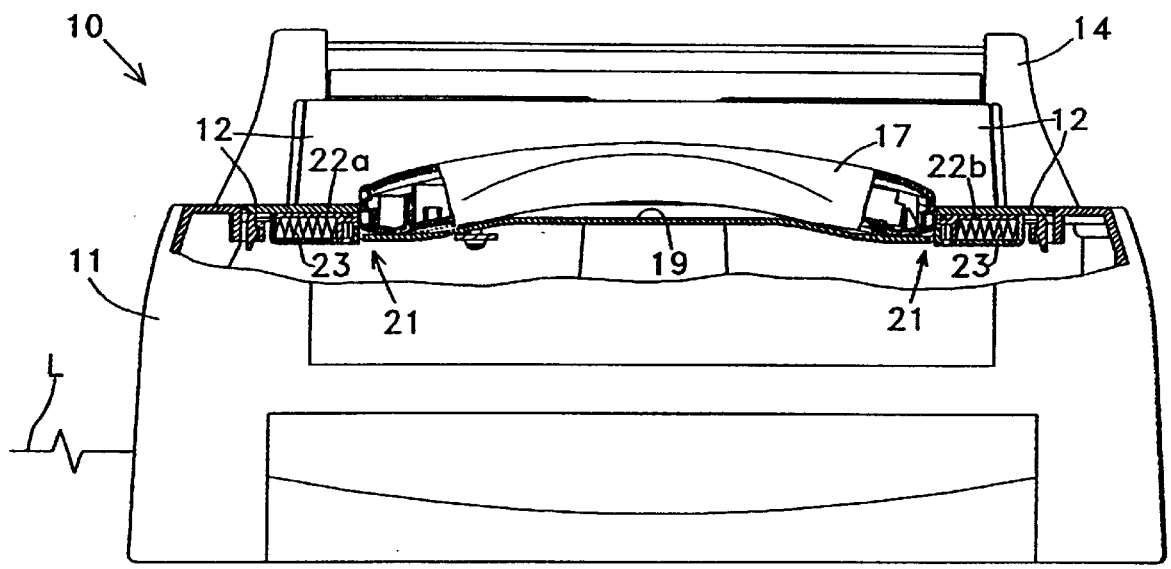
Fig. 2
Fig. 4
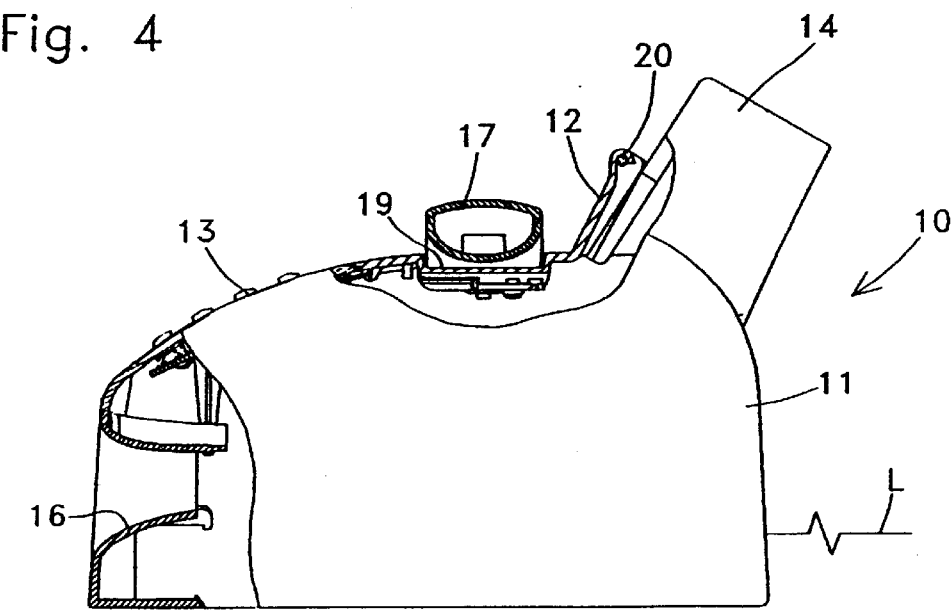

FACSIMILE MACHINE PROVIDED WITH A TELEPHONIC HANDSET

FIELD OF THE INVENTION

This invention relates generally to a facsimile machine and, more particularly, to a facsimile machine comprising a casing, a lid hinge-mounted on the casing to grant access to the inside of the machine, and a telephone handset.

BACKGROUND OF THE INVENTION

Facsimile machines having the characteristics listed above are widely known in commerce and are finding more and more favour with the consumer public.

In particular, these facsimile machines, or fax machines as they will be referred to more simply hereinbelow, are capable not only of effecting the usual reading and printing operations, in order respectively to transmit and receive documents, but also of allowing an operator to make normal voice telephone calls.

At the moment, however, there are a number of drawbacks with the fax machines offering these features, consisting essentially of the larger overall dimensions, due to the presence of the telephone handset, than fax machines not provided with the latter.

In particular, on some of these fax machine models, the telephone handset is removably accommodated in a cradle disposed along one side of the fax machine, but this cradle results in the fax machine having increased lateral dimensions.

Other fax machine models are provided with a cradle made in the upper part of their casing and designed for accommodating the telephone handset, but again this solution fails to avoid increasing the overall dimensions of these fax machines.

More specifically, with the solution proposed above, the space occupied by the cradle for the telephone handset detracts from the space available at the upper part of the facsimile, where the devices and associated trays for storage and feeding of paper are arranged, making it necessary in any case to increase the overall dimensions of the fax machine itself, compared to cases when it is not provided with the handset, in order to leave room for these devices.

SUMMARY OF THE INVENTION

The object of this invention is to produce a fax machine which, though provided with a telephone handset, has global dimensions, and in particular plan dimensions, that are not greater on account of presence of the telephone handset, so as to assume a more compact shape with respect to the known fax machines.

This object is attained by the fax machine having the characteristics enunciated in the main claim.

Another object of this invention is to produce a fax machine comprising a telephone handset and a lid suitable for accommodating the handset, wherein the telephone functionality, i.e. the possibility of receiving phone calls from the outside through the handset, is not affected by the action of raising the lid to gain access to the inside of the fax machine.

BRIEF DESCRIPTION OF THE DRAWINGS

These and other characteristics of the present invention will become apparent upon consideration of the following description of a preferred embodiment, provided by way of a non-exhaustive example, in conjunction with the accompanying drawings, wherein:

FIG. 2 is a front view in partial section of the machine of FIG. 1;

FIG. 4 is a lateral, schematic view in partial section of the fax machine of FIG. 1;

DESCRIPTION OF A PREFERRED EMBODIMENT OF THE INVENTION

Figure 1:
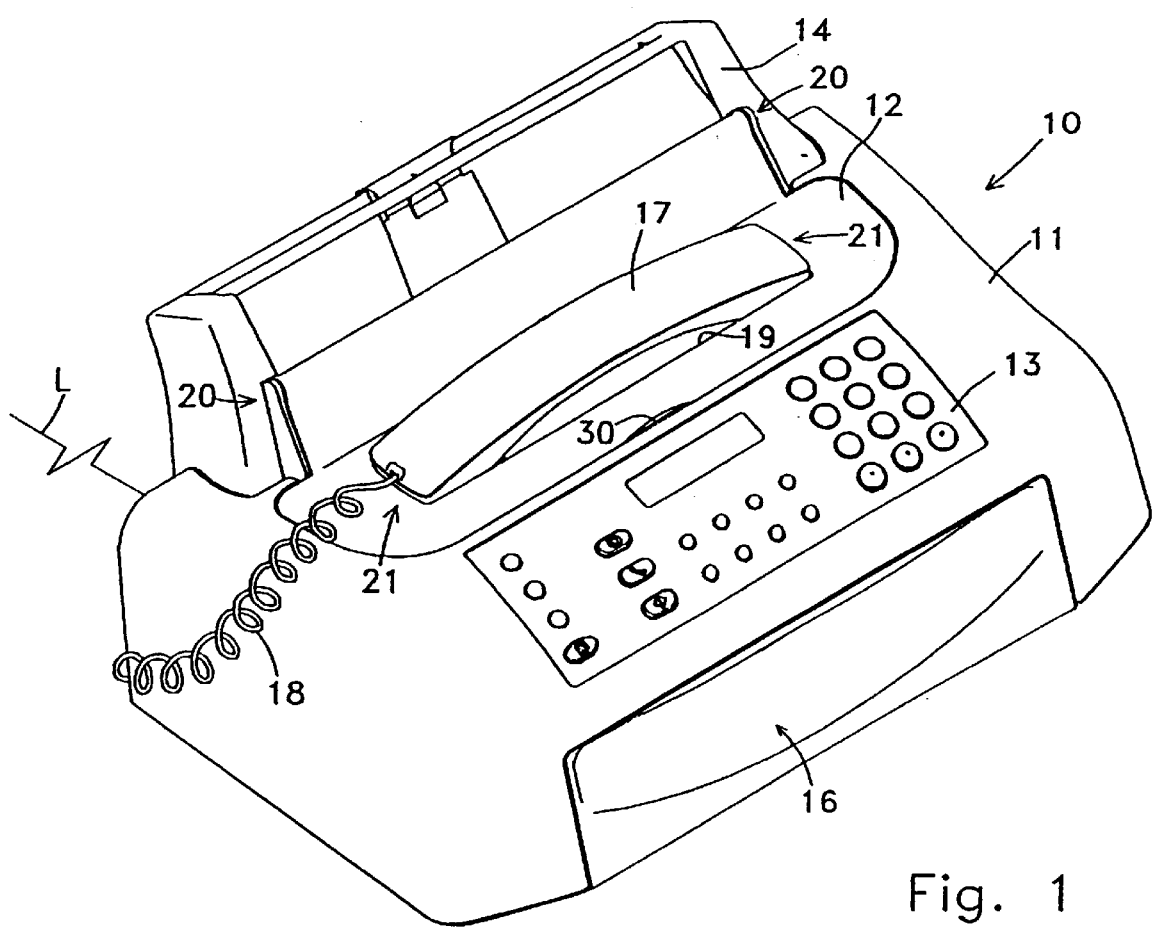
FIG. 1 is a perspective view of a fax machine according to the present invention, when a lid of the machine is closed.
Figure 5:
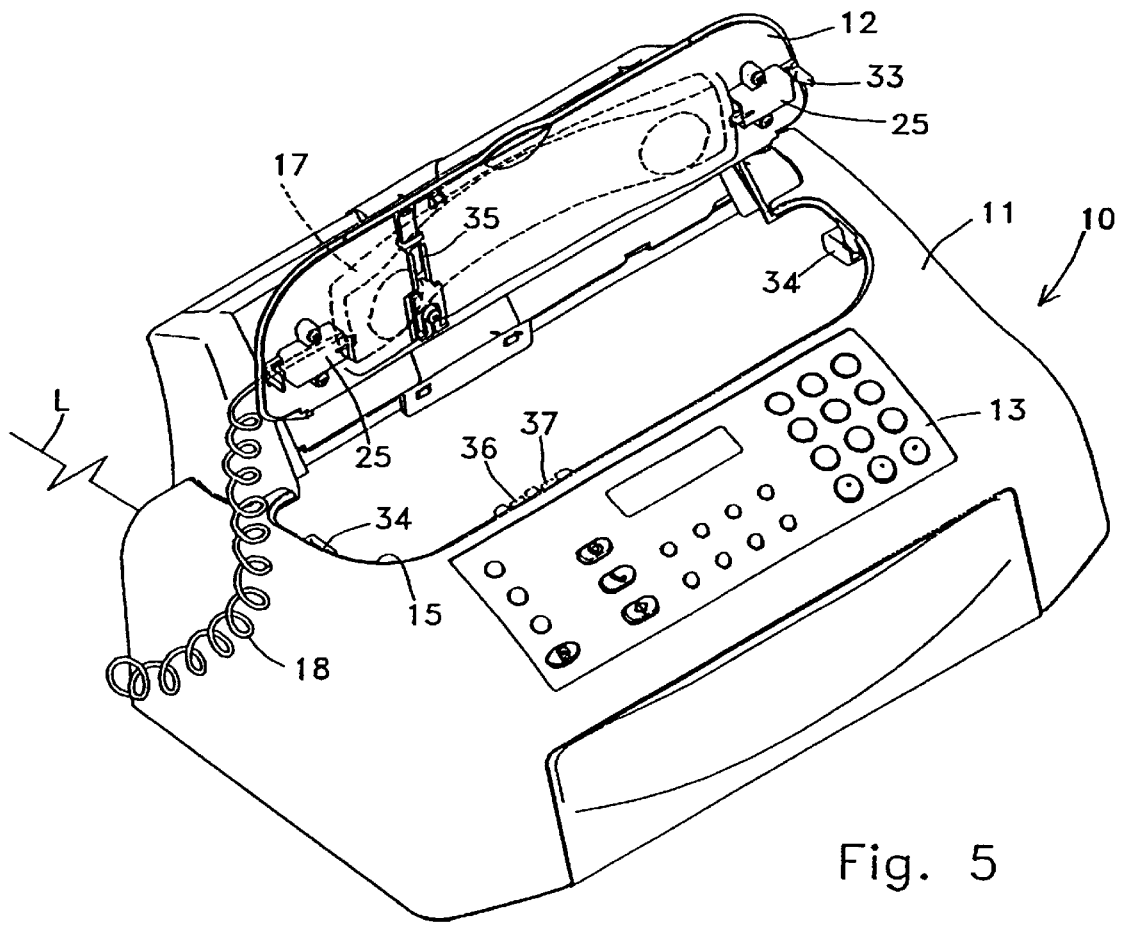
FIG. 5 is a perspective view of the fax machine of FIG. 1, when the lid is open.
Figure 6:
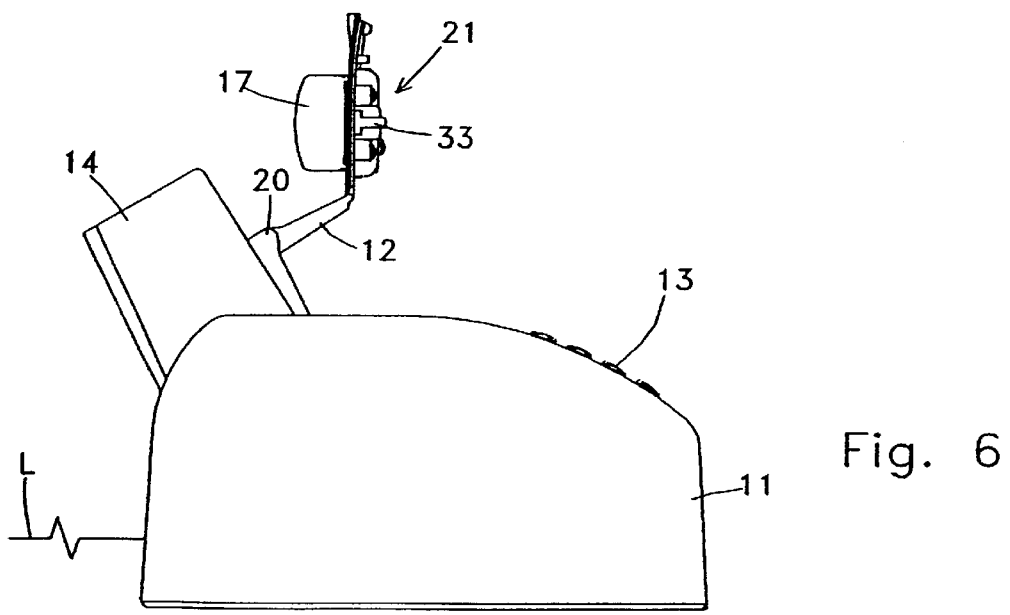
FIG. 6 is a lateral schematic view of the fax machine of FIG. 5.

With reference to FIGS. 1 and 5, a fax machine according to this invention, generically indicated with the numeral 10, is connected to a telephone line L and is provided with both the facsimile functionality, allowing a user to receive and transmit documents, through the telephone line L, and also the telephone functionality, allowing the same user to receive and make voice phone calls, again using the telephone line L.

The fax machine 10 comprises a base or casing 11 which defines an upper aperture 15; a lid 12 fulcrum-mounted on the base 11 by means of a hinge 20 and suitable for being flipped up manually away from the casing 11 from a closed position, wherein it is disposed flush with the casing 11 in order to shut the aperture 15, into an open position, wherein it uncovers the aperture 15 granting access to the inside of the fax machine 10, to replace a printhead, for example; a keyboard 13 for entering the operations to be effected by the fax machine 10; a device 14 for accommodating blank sheets of paper and written documents intended for processing by the fax machine 10, respectively to be printed and to be read and transmitted by the latter, along the telephone line L; an outlet aperture 16 for the expulsion of the sheets and of the documents after they have been processed by the fax machine 10; and a telephone handset 17 suitable for allowing a user of the fax machine 10 to receive or make a normal voice telephone call, using the telephone line L.

In addition, the lid 12 is provided with a front rim 30 which is slightly raised with respect to the surface of the casing 11 when the lid is closed, its purpose being to serve as a manual grip for the user when wanting to flip the lid 12 up from its closed position.

The other parts comprising the structure of the fax machine, particularly the electronic ones which generally control its functions and are typically accommodated inside the casing 11, will not be described in detail and will be referred to only occasionally, whenever necessary for a clearer understanding of the invention, as they are clearly of known type and not closely related to this invention.

According to one characteristic of this invention, the lid 12 is designed to accommodate the telephone handset 17 when it is not being used by a user for telephoning or, to use the jargon term, for "engaging" the telephone line L.

To this effect, the lid 12 comprises a cradle 19, made in the outer surface of the lid 12 and having an embedded shape roughly copying that of the handset 17, in which the user puts the latter down after each phone call.

A presence sensor, indicating the presence or otherwise of the telephone handset 17 in the cradle 19, comprises a lever 35 (FIG. 35) fitted on the lid 12 and having a first end, not depicted in the drawings, protruding into the cradle 19, and a second end suitable for cooperating with a contact element 36 arranged along the edge of the aperture 15.

In particular, when the lid 12 is in its closed position and the handset 17 is in the cradle 19, the lever 35 will have its first end moved downwards on account of the weight of the handset 17, thereby closing or opening a contact through its second end and the corresponding contact element 36, and will accordingly indicate to a central control unit of the fax machine 10 that the handset 17 is present in the cradle 19.

As is known, the lever 35, when moved downwards, releases the telephone line L so that the handset 17 can receive telephone calls from the outside; conversely, when it is up on account of the handset 17 being removed from the cradle 19, it engages the line thereby preventing the latter from receiving telephone calls.

The telephone handset 17 comprises, as is usually the case, a microphone and a loudspeaker and is connected by a flexible cable 18 to the central control unit of the fax machine 10.

In greater detail, the latter, which is not depicted in the drawings for simplicity's sake, is designed to control general operation of the fax machine 10, and in particular to control the use and availability of the telephone line L for receiving or making voice telephone calls through the handset 17.

Furthermore, according to another characteristic of the invention, the lid 12 is provided with retaining means, generically indicated with the numeral 21, intended to leave the telephone handset 17 free to be removed from the cradle 19 when the lid 12 is in its closed position, and also to retain the handset 17 in the cradle 19 when the lid 12 is flipped upwards, about the hinge 20, from its closed position into its open position.

Accordingly the telephone handset 17 does not have to be removed from its cradle 19, to prevent it from falling, whenever the user wants to flip up the lid 12, for instance, to change the printhead fitted inside the fax machine 11.

Figure 3:
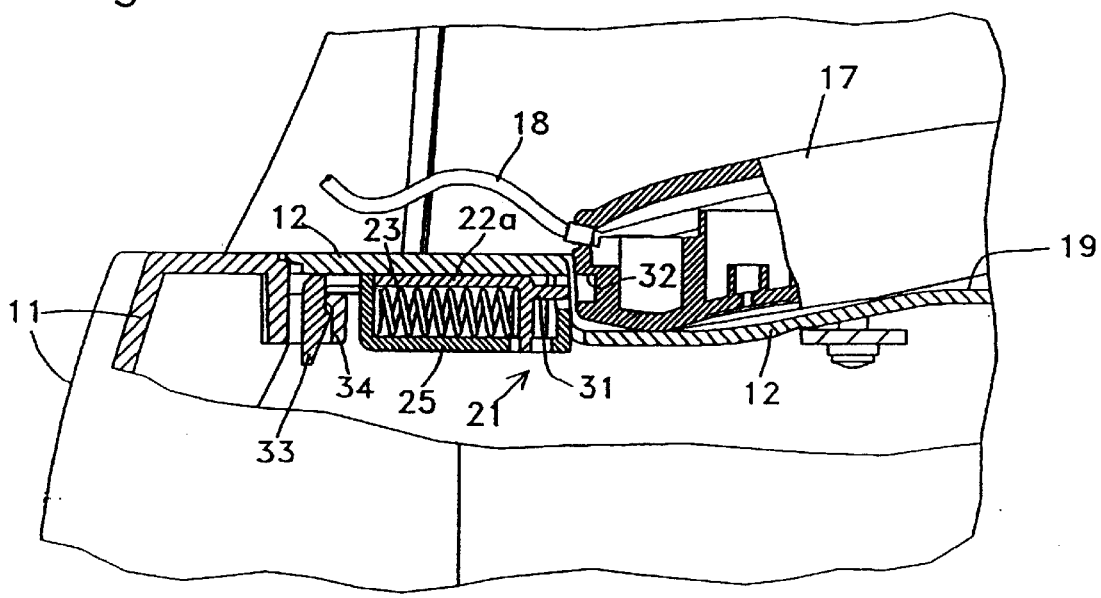
FIG. 3 represents details in an enlarged scale of some parts of FIG. 2.

More particularly, the retaining means 21 comprise, as can be seen clearly from FIGS. 2 and 3, two catches 22a and 22b fitted on the sides of the lid 12, towards the inside of the fax machine 10 and at opposite ends with respect to the cradle 19, and accommodated slidingly in respective cases 25, wherein they are constantly subject to the thrust of two corresponding compression springs 23 urging them to converge upon the cradle 19.

Each catch 22a and 22b has an inner end 31 suitable for protruding into the cradle 19, urged by the spring 23, to cooperate with a corresponding recess 32 made in one side of the telephone handset 17, and an outer, wedge-shaped end 33, bent towards the inside of the fax machine, designed to cooperate with a shoulder 34 made in the casing 11, along the edge of the aperture 15, in order to withdraw the inner end 31 from the cradle 19, as will be described below.

In addition to the presence sensor, a position sensor is also provided, designed to indicate position of the lid 12, comprising a contact element 37 arranged adjacent to the contact element 36 and suitable for cooperating with the edge of the lid 12, in order to open or close a contact, when the lid is flipped upwards from its closed position, and accordingly to indicate to the central control unit of the fax machine 10 the position, closed or open, of the lid 12 with respect to the casing 11.

The signals generated by the contact elements 36 and 37, indicative respectively of the presence or otherwise of the telephone handset 17 in the cradle 19 and of the position of the lid 12, are used by the control unit of the fax machine to properly control the use and availability of the telephone line L for receiving and transmitting phone calls through the handset 17, as will be described in greater detail later.

During operation, the telephone handset 17 is lying in the cradle 19 to begin with and the lid 12 is closed on the casing 11. In this position, the outer ends 33 of the catches 22a and 22b are engaging with the shoulder 34 of the casing 11, so that the other, inner ends 31 are withdrawn from the cradle 19, leaving the telephone handset 17 free to be removed from the cradle 19 itself.

At this point the lid 12 is flipped up by the operator by means of the projecting rim 30, causing the outer ends 33 to disengage from the edge 34 of the casing 11 and consequently the two catches 22a and 22b, urged by the springs 23, to slide towards the cradle 19, so that the inner ends 31 enter the recesses 32.

In this way, during the rotation of the lid 12 and for all the time in which the latter is raised, the telephone handset 17 is firmly restrained in the cradle 19 by the inner ends 31, without any risk of falling out.

Furthermore, when the lid 12 is rotated with respect to the casing 11, the lever 35 disengages from its corresponding contact element 36, but in spite of this the telephone line L still does not become engaged and remains free enabling any incoming voice telephone calls to be received by the fax machine 10, even when the lid 12 is raised.

To this end, the signal activated by the disengagement of the lever 35 from its corresponding contact element 36 is associated by the central control unit of the fax machine 10 with the signal activated by the contact element 37 following the departure of the lid 12 from its closed position, so that the handset 12 does not engage the line even if the lid 12 is raised.

In other words the fax machine 10, even with the lid 12 in its open position, operates in such a way that the telephone line L is free, so that a telephone call from the outside is signalled by ringing, just as if the lid 12 was still in its closed position.

In this case, of course, the user will first have to close the lid 12 and then take the handset 17 from the cradle 19 to answer the call coming from the outside.

Furthermore, the transmission of data along the telephone line L for transmitting or receiving documents may take place as usual, regardless of the position of the lid 12.

Accordingly, the operation of flipping up the lid 12 does not interfere with or in any way limit the fax functionality of the fax machine 10.

Obviously, only in the case where the user lifts the lid 12 without first putting the telephone handset 17 in the cradle 19 will the line L be busy for the whole time that the lid is raised.

Subsequently, when the lid 12 is closed again on the casing 11, the outer ends 33 of the catches 22a and 22b engage with the edge 34 again, causing the catches 22a and 22b to slide towards the outside of the fax machine and, as a result, the inner ends 31 withdraw from the recesses 32 in the telephone handset 17, which is thus completely released and is again suitable to be removed unimpeded from its cradle 19.

It is clear that the invention enables construction of a fax machine that is of compact plan dimensions, in spite of the presence of the telephone handset, and is also just as amenable as a machine without the handset, for performing the operation of lifting the lid in order to gain access to the inside of the machine.

In particular, the user can raise the lid 12 in the usual way, without fear, and without first having to remove the telephone handset 17 from its cradle 19 and set it somewhere else, to prevent it from falling due to rotation of the lid 12.

Another important advantage of the device is that it allows the lid to be flipped back in order to gain access to the inside of the machine and effect various operations, such as substituting the printhead, checking the paper, removing the paper or eliminating a paper jam, and still other operations, without the telephone line becoming engaged by the handset, so that the machine's telephone and fax functionalities remain unaltered for the whole time that these operations require.

It is understood that changes and/or improvements may be made to the fax machine described up to now, without exiting from the scope of this invention.

What we claim is:

1. Fax machine comprising a casing, a lid fulcrum-mounted on said casing to rotate from a closed position into an open position in which access is granted to the inside of the machine, and a telephone handset, wherein said lid is provided with a cradle, integral with said lid, for removably accommodating said telephone handset, and moreover with retaining means for retaining said telephone handset in said cradle, when said lid is rotated into said open position.

2. Fax machine according to claim 1, wherein said retaining means are capable of selectively releasing said telephone handset to enable it to be removed from said cradle, when said lid is in said closed position.

3. Fax machine according to claim 2, wherein said retaining means comprise at least a first catch, urged by a spring, movable between a first position in which said first catch enables free removal of the telephone handset from said cradle, and a second position in which said first catch cooperates with said telephone handset to retain it in said cradle, said first catch being provided to move from said first to said second position when said lid is rotated away from its closed position.

4. Fax machine according to claim 3, wherein said retaining means further comprise a second catch, and said catches are arranged at opposite ends of said lid and on the sides of said cradle, and are also suitable for cooperating on two ends of said telephone handset to release it or retain it in said cradle.

5. Fax machine according to claim 2, wherein said cradle has an embedded shape with respect to an outer surface of said lid suitable for receiving said telephone handset.

6. Fax machine according to claim 2, comprising a control unit connected to a telephone line, a position sensor to indicate the position of said lid with respect to said casing and a presence sensor to indicate the presence of said telephone handset in said cradle, said sensors being associated with said control unit to control the availability and use of said telephone line for the transmission and reception of voice calls through said telephone handset.

7. Fax machine according to claim 6, wherein said control unit is suitable for operating in relation to the signals generated by said sensors to keep said telephone line free for the reception of voice phone calls from the outside, when said lid is rotated into said open position with said telephone handset placed in said cradle.

* * * * *